(12) United States Patent
Niebling et al.

(10) Patent No.: US 7,931,408 B2
(45) Date of Patent: Apr. 26, 2011

(54) UNIT COMPRISING A WHEEL BEARING AND AT LEAST ONE VEHICLE-SIDED FIXED SUPPORT

(75) Inventors: Peter Niebling, Bad Kissingen (DE);
Gottfried Ruoff, Oberwerrn (DE);
Horst Doeppling, Herzogenaurach (DE);
Darius Dlugai, Schweinfurt (DE); Ralf Stopp, Buehl (DE)

(73) Assignee: Schaeffler KG, Herzogenaurach (DE)

( * ) Notice: Subject to any disclaimer, the term of this patent is extended or adjusted under 35 U.S.C. 154(b) by 594 days.

(21) Appl. No.: 11/719,443

(22) PCT Filed: Nov. 11, 2005

(86) PCT No.: PCT/DE2005/002036
§ 371 (c)(1),
(2), (4) Date: Aug. 20, 2007

(87) PCT Pub. No.: WO2006/053533
PCT Pub. Date: May 26, 2006

(65) Prior Publication Data
US 2009/0142012 A1    Jun. 4, 2009

(30) Foreign Application Priority Data

Nov. 16, 2004   (DE) .......................... 10 2004 055 204

(51) Int. Cl.
*F16C 13/04*   (2006.01)
*F16C 43/00*   (2006.01)

(52) U.S. Cl. ........................................ 384/544; 384/537
(58) Field of Classification Search .................. 384/537, 384/544, 448, 484; 301/24.03, 31.3, 37.104, 301/64.302; 474/170, 181, 902, 903
See application file for complete search history.

(56) References Cited

U.S. PATENT DOCUMENTS

| 2,019,464 | A |   | 10/1935 | Riblet |
|---|---|---|---|---|
| 2,132,029 | A | * | 10/1938 | Higbee ......................... 301/36.2 |
| 2,214,457 | A | * | 9/1940 | Fuhrman ....................... 301/36.3 |
| 2,239,674 | A | * | 4/1941 | Frederickson .............. 180/24.03 |
| 2,260,828 | A | * | 10/1941 | Burger ......................... 188/18 R |

(Continued)

FOREIGN PATENT DOCUMENTS

DE    38 23 442 A    2/1990

(Continued)

*Primary Examiner* — Marcus Charles
(74) *Attorney, Agent, or Firm* — Lucas & Mercanti, LLP

(57) ABSTRACT

A unit, which has a wheel bearing and at least one vehicle-sided fixed support. The wheel bearing has at least one outer part which is rigidly fixed to at least one bearing seat which is embodied as an axial passage of a sheet metal molded part of the support, and at least one end section of the outer part is surrounded in a radial and supple manner, at least in the proximity of the passage such that the end section engages in an axial mariner behind the support.

8 Claims, 7 Drawing Sheets

U.S. PATENT DOCUMENTS

| | | | | |
|---|---|---|---|---|
| 2,270,918 | A | * | 1/1942 | Ash .................................. 301/13.1 |
| 2,298,333 | A | * | 10/1942 | Ash et al. ........................ 301/6.3 |
| 2,623,792 | A | * | 12/1952 | Mills .............................. 301/13.1 |
| 2,692,801 | A | * | 10/1954 | Rosenberg ............... 301/64.302 |
| 2,744,800 | A | * | 5/1956 | Black, Jr. ...................... 384/482 |
| 2,750,238 | A | * | 6/1956 | Black, Jr. ...................... 384/482 |
| 2,756,495 | A | * | 7/1956 | Lathrop .................. 29/898.055 |
| 2,773,723 | A | * | 12/1956 | Randall ....................... 180/24.03 |
| 2,981,120 | A | * | 4/1961 | Schultz, Jr. ................... 474/902 |
| 2,988,400 | A | * | 6/1961 | Ash .............................. 301/36.2 |
| 3,069,919 | A | * | 12/1962 | Schultz, Jr. ................... 474/902 |
| 3,355,218 | A | * | 11/1967 | Forbush ........................ 301/6.1 |
| 3,847,442 | A | * | 11/1974 | Masser ........................ 301/13.2 |
| 4,243,269 | A | * | 1/1981 | Walther et al. ............... 301/12.1 |
| 4,295,686 | A | * | 10/1981 | Black ....................... 301/64.302 |
| 4,824,423 | A | * | 4/1989 | Jocic ............................ 474/903 |
| 6,293,704 | B1 | | 9/2001 | Gradu |
| 2003/0077016 | A1 | | 4/2003 | Iarrera et al. |

FOREIGN PATENT DOCUMENTS

| | | |
|---|---|---|
| DE | 201 08 362 A | 9/2001 |
| EP | 0 794 072 A | 9/1997 |
| EP | 1 424 217 Y | 6/2004 |

\* cited by examiner

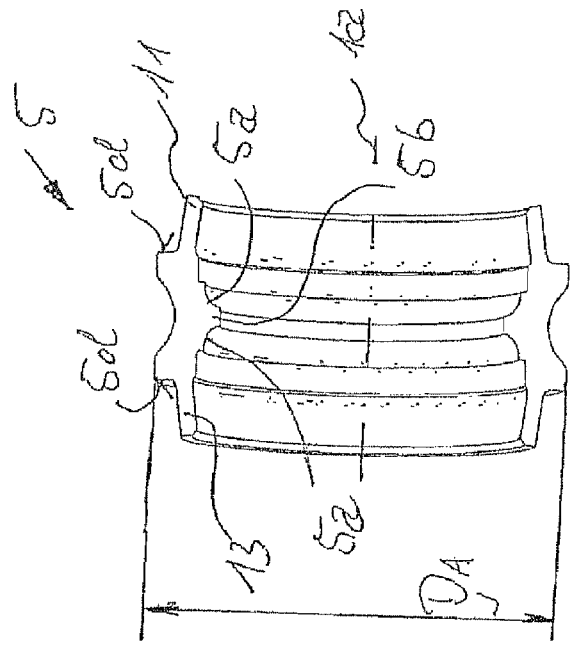
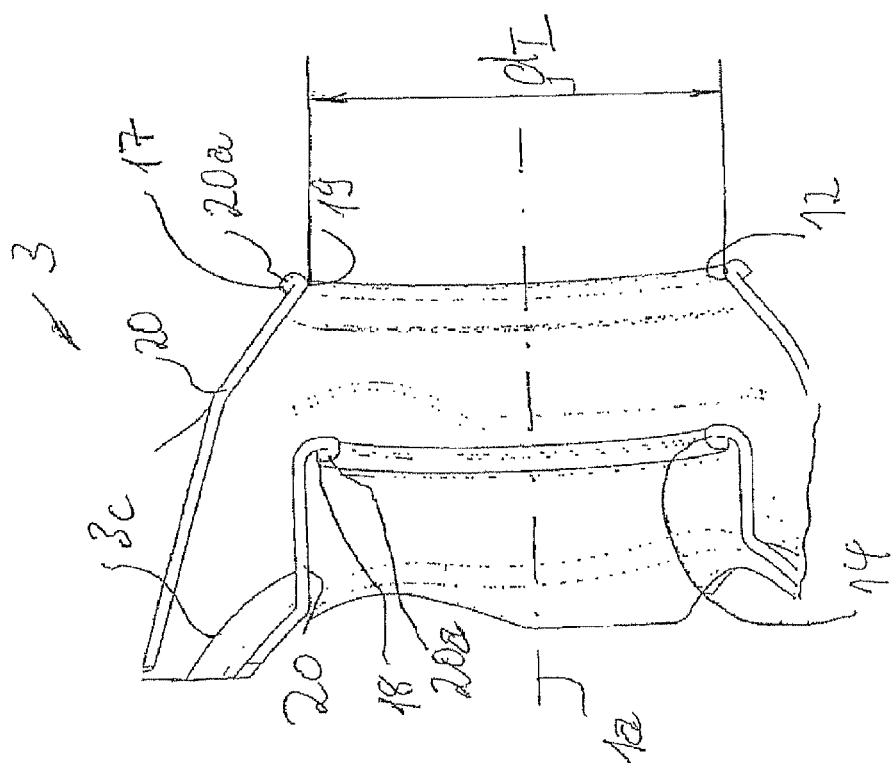
Fig. 3
Fig. 2

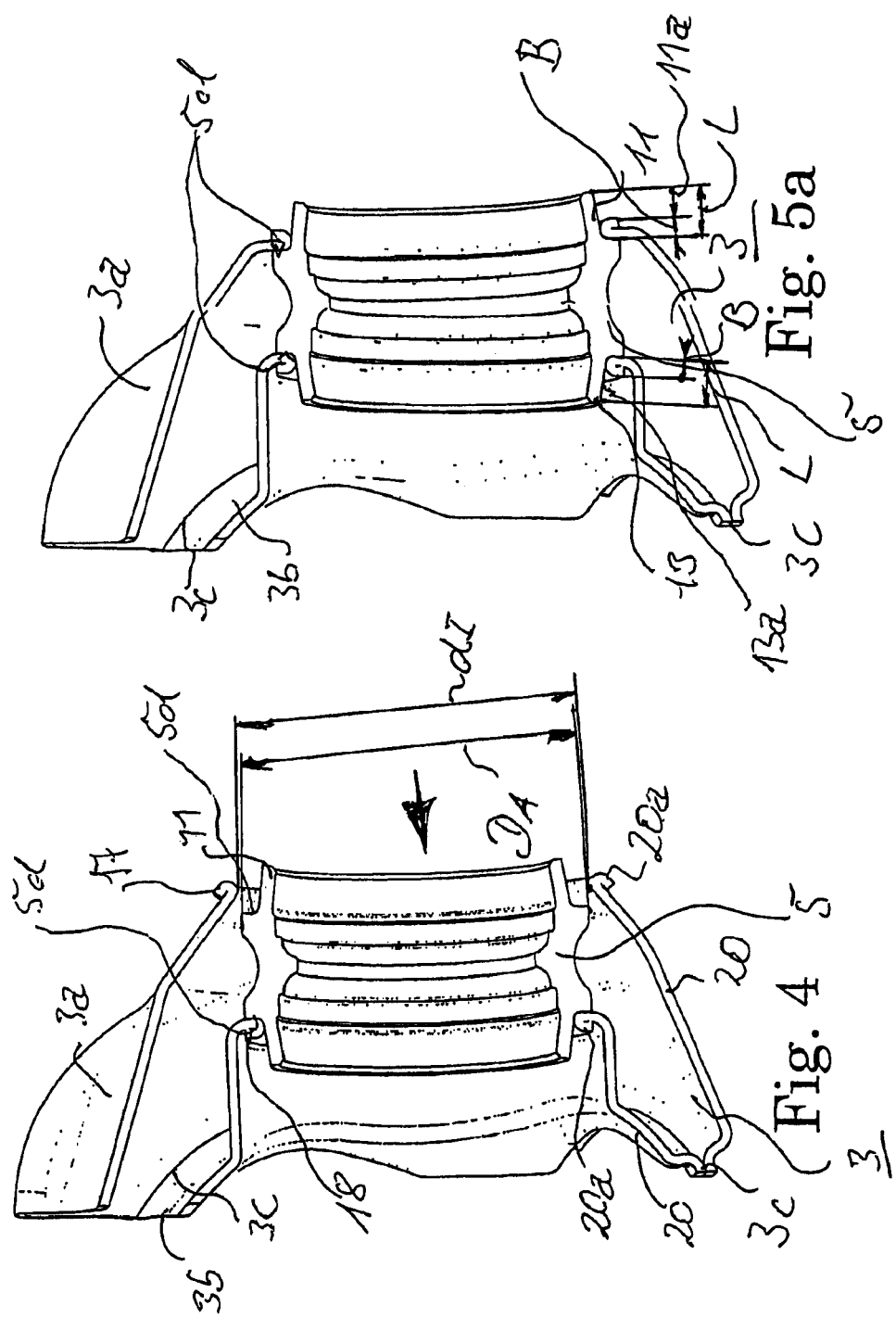

UNIT COMPRISING A WHEEL BEARING AND AT LEAST ONE VEHICLE-SIDED FIXED SUPPORT

FIELD OF THE INVENTION

The invention relates to a unit comprising a wheel bearing and at least one vehicle-sided fixed support, the wheel bearing being seated fixedly by way of at least one outer part in at least one bearing seat which is formed as an axial passage of a sheet metal formed part of the support, and at least one end section of the outer part being folded over radially in a plastic manner at least near the passage, in such a way that the end section engages axially behind the support.

BACKGROUND OF THE INVENTION

A unit of this type is described in greater detail in EP 1 424 217 A2. The support is formed from two support elements which are formed in a shell shape from sheet metal. Each of the support elements has one of the bearing seats which is formed in the shape of a sleeve from the edge region of the support element as an axial passage through the respective support element. In this case, the inner contour of the bearing seat is of hollow-cylindrical configuration and is therefore provided with a continuously unchanged identical internal cross section over the entire axial width. The outer ring which has to have a continuously cylindrical shape on the outside on account of the design and arrangement of the bearing seats is inserted into the bearing seats. End sections are folded over on the outer ring in such a way that the end sections clamp the support between them axially and free from play. The clamping force is produced from the material of the outer ring when end sections are folded over in a radial and plastic manner.

SUMMARY OF THE INVENTION

At the time at which the invention was made, the object was to provide a unit comprising a support and the wheel bearing, in which, in particular, the bearing seat, which is formed as an axial passage of a sheet metal formed part of the support, can be manufactured simply and inexpensively and can be of robust configuration.

The object is achieved in that the passage has one radial narrow point. The radial internal cross-section of the passage decreases more and more at least at an inner section of the passage at a decreasing axial spacing from the narrow point. That is to say, the free passage of the bearing seat becomes increasingly narrow toward the narrow point. In other words, the internal cross-section becomes greater, starting from the narrow point, at an increasing axial spacing from the narrow point and therefore has an inner contour which deviates from an inner cylindrical design.

The passage has one radial narrow point. The radial internal cross section of the passage decreases more and more at least at an inner section of the passage at a decreasing axial spacing from the narrow point, that is to say the free passage of the bearing seat becomes increasingly narrow toward the narrow point. In other words, the internal cross section becomes greater, starting from the narrow point, at an increasing axial spacing from the narrow point and therefore has an inner contour which deviates from an inner cylindrical design.

The axial direction is the direction which is oriented in the same direction as the bearing center axis. The passage is rotationally symmetrical as a rule. The width of the increasingly narrowing inner section is at least configured in such a way that the axial spacing from the location, from which the internal cross section begins to decrease in the direction of the narrow point, corresponds to at least half the maximum axial width of the passage which is oriented in the same direction as the bearing's rotational axis. The outer contour of the outer part is configured in a manner which is adapted to the inner contour of the passage, in such a way that the outer contour, which is surrounded by the bearing seat, of an outer part of the wheel bearing which is seated in the bearing seat bears against the inner contour of the passage at least at the narrow point.

The outer contour, which is surrounded by the bearing seat, of an outer part of the wheel bearing which is seated in the bearing seat bears against the inner contour, that is to say the outer contour is adapted to the profile of the inner contour at least in the radial direction. Accordingly, both the inner contour and the outer contour have an inner contour which deviates from the circular-cylindrical design, it being possible but not necessary for the contours to correspond with one another, as has already been mentioned.

This inner contour can be described, for example, by the inner contour of a hollow truncated cone. The outer part which has a correspondingly adapted conical outer contour at least on the bearing seat is then pressed into a contour of this type. As an alternative, there is provision according to one refinement of the invention for the inner contour to be of spherical configuration in such a way that the inner contour protrudes radially the furthest into the passage at least at the narrow point, in a circumferential manner about the bearing axis.

On the bearing seat, preferably at least on the side where the end section is folded over radially, the outer part has an outer contour which corresponds with the inner contour of the passage and is deformed plastically against the inner contour.

In a bearing seat which is configured in this way, greatest axially acting forces are also absorbed during assembly of the outer part into the support and also during driving operation of the vehicle. The expenditure during the assembly in terms of apparatus technology is reduced, as the narrow point in the passage forms an axial stop for the position of the outer ring itself and also directs the deformation forces, which result from the plastic folding over of the end section of the outer part, into the support.

The outer part is a support or adapter sleeve between at least one outer ring of the wheel bearing and the respective support element, in which the outer ring is accommodated. The support optionally accommodates a wheel bearing comprising one or at least two single-row or multiple-row bearings having one or more outer/inner bearing rings. As an alternative, the outer part is an outer ring of the wheel bearing having at least one raceway, but as a rule having two or more raceways for rolling bodies. The outer ring is configured, at least on the outside on the outer section in the bearing seat, to be rotationally symmetrical about the rotational axis of the wheel bearing.

The supports or the support elements having a bearing seat according to the invention can be manufactured simply. The nonreleasable connection between the wheel bearing and the support can likewise be manufactured simply, as the wheel bearing is positioned and held precisely in one or optionally two of the seats before final axial securing, without it being necessary for special expenditure to be made for the positional fixing of the components with respect to one another.

As an alternative, the support bears fixedly against two stops which face away from one another, preferably axially, that is to say in the same direction as the bearing's rotational axis of the wheel bearing. The stops are fixed to the outer ring or to an outer part relative to the outer ring. If the stops are fixed to an outer part, at least one outer ring of the wheel bearing is accommodated in the outer part of any desired design. At least one of the stops is fixed on the outer part or preferably on the outer ring as a separate part, for example in the form of a securing ring/a securing washer for shaft seats, or is configured in one piece on the outer ring.

The outer ring is machined with the removal of material or else is a cold formed part, in which two of the raceways are formed. Each of the end sections protrudes axially in a different direction from a basic body of the outer ring.

The respective stop protrudes radially beyond the end section to such an extent that the support comes into axial contact with the stop at least by way of a part of the edge zone of the bearing seat on the support. For this purpose, the inner contour of the bearing seat corresponds with the respective stop in such a way that the axial stop always bears against the edge zone of the bearing seat even under high loads and is not accidentally pressed into the bearing seat or through the latter.

On the other side of the wall of the support, an end which is shaped radially away from the end section and is made from the material of the end section lies opposite the stop. Like the stop which lies opposite on the other side of the wall, this end likewise protrudes radially into the edge zone to such an extent that a secure connection is produced between the support and the wheel bearing at the bearing seat. It is also conceivable that, within the respective bearing seat, the end which is shaped radially from the end section bears axially against the edge zone of a through opening in the bearing seat and therefore does not protrude, or protrudes only partially, axially out of the bearing seat. The stops are preferably circularly annular faces.

The inner contours of the bearing seats and the outer contours of the end sections are configured as desired in all conceivable shapes which correspond with one another, but are preferably configured to be rotationally symmetrical with respect to the bearing's rotational axis of the wheel bearing. It is also conceivable that the outer ring is secured against rotation in the support in the circumferential direction about the rotational axis of the wheel bearing by means which engage into one another in a form-fitting manner. The form-fitting means are formed on the end section or on its formed end or else on the axial stop. Form-fitting corresponding means on the bearing seat or on the edge zone of the relevant bearing seat correspond with the form-fitting means. The means are one or more securing means which protrude or are recessed radially or axially and engage into one another in a correspondingly form-fitting manner, such as toothing systems which are in engagement with one another.

The end is preferably a flange collar, also called a rolling rivet flange. A flange of this type is produced by plastic deformation of an annular section of the material of the end section which initially protrudes radially from the end section. To this end, the end sections are longer in the axial direction before the fastening of the outer ring in the bearing seats than the respective bearing seats, which are assigned to one of the end sections and are formed in the shape of holes, are wide in the axial direction. The portion of material of the end sections which projects in this way axially out of the bearing seat beyond the support on that side of the support which faces away from the stop forms the radially folded over ends after the fastening of the outer ring to the support.

During the fastening of the outer ring in the support, the material of the end sections is displaced radially outward and deformed in such a way that a rivet flange/head is formed by the respective end, which rivet flange/head is configured rotationally symmetrically with respect to the rotational axis of the wheel bearing and integrally with the end section and protrudes radially beyond the outer circumferential face of that section on the end section which remains in the through hole. The external diameter of the end sections is reduced at an increasing spacing from the respective axial stop, at least at the annular section which is provided for forming the end, before the ends are folded over radially. The wall thickness of the end sections, which are configured to be rotationally symmetrical with respect to the rotational axis of the wheel bearing before the ends are folded over radially, decreases as the axial spacing from the stops increases, before the ends are folded over radially. As a result of measures of this type, for example, the forming forces and the degree of forming during rolling riveting can be adapted in an optimum manner. As viewed in a longitudinal section through the end section along the rotational axis of the wheel bearing, the outer contour of the end sections is curved or extends in a straight falling line toward the end before the ends are folded over radially.

The support preferably comprises at least one shaped part made from sheet metal, preferably from a cold forming process. The bearing seat is a through hole in the metal sheet of the support. The wheel bearing is connected to the vehicle by means of at least one support or by means of two or more support elements which are connected to one another or not directly to one another, two support elements being provided in each case with one of the bearing seats. For example, the wheel bearing is preferably held in a support which comprises at least two formed parts which are formed in shell shapes and are made from sheet metal. These formed parts are, for example, welded or riveted to one another. Sheet metal having a small wall thickness is preferably used for the support and its elements, in order to keep the weight of the unit as low as possible. Shells of this type achieve high stability by a corresponding design.

In particular when thin sheet metal is used for the support or the support elements, the bearing seat is formed in a doubling of the metal sheet, as one refinement of the invention provides. The doubling of the metal sheet is formed by the edge of the bearing seat, which edge is first of all pushed through in the axial direction by approximately 90° with respect to the metal sheet during the manufacture of the support, and is then finally folded over radially in a manner which is oriented away from the center axis of the bearing seat, and is positioned against the support.

The bearing seat is delimited on the inside by an inner circumferential face which deviates from a circular shape. Accordingly, the inner circumferential face is alternatively of internally conical or spherical configuration.

The sequence of the assembly of the support or its elements onto an outer ring having two stops which face away from one another and one of the end sections which protrudes from the respective stop is dependent on the construction of the support. The assembly of two support elements which are independent of one another is simple, as each of the support elements is pushed onto one of the end sections at its bearing seat and is then fastened by folding over of the end section. The support elements are accordingly either fixed on the outer ring individually and separately from one another or are then connected to one another to form a common support in a subsequent step.

BRIEF DESCRIPTION OF THE DRAWINGS

In the following text, the invention will be explained in greater detail using exemplary embodiments.

FIG. 2 illustrates a sectional view of a sectional view of a support of the present invention;

FIG. 3 illustrates a sectional view of the outer ring of the present invention;

FIGS. 4, 5a and 5b and 5c illustrate individual steps to construct the assembly of the present invention.

DETAILED DESCRIPTION OF THE INVENTION

Figure 1:
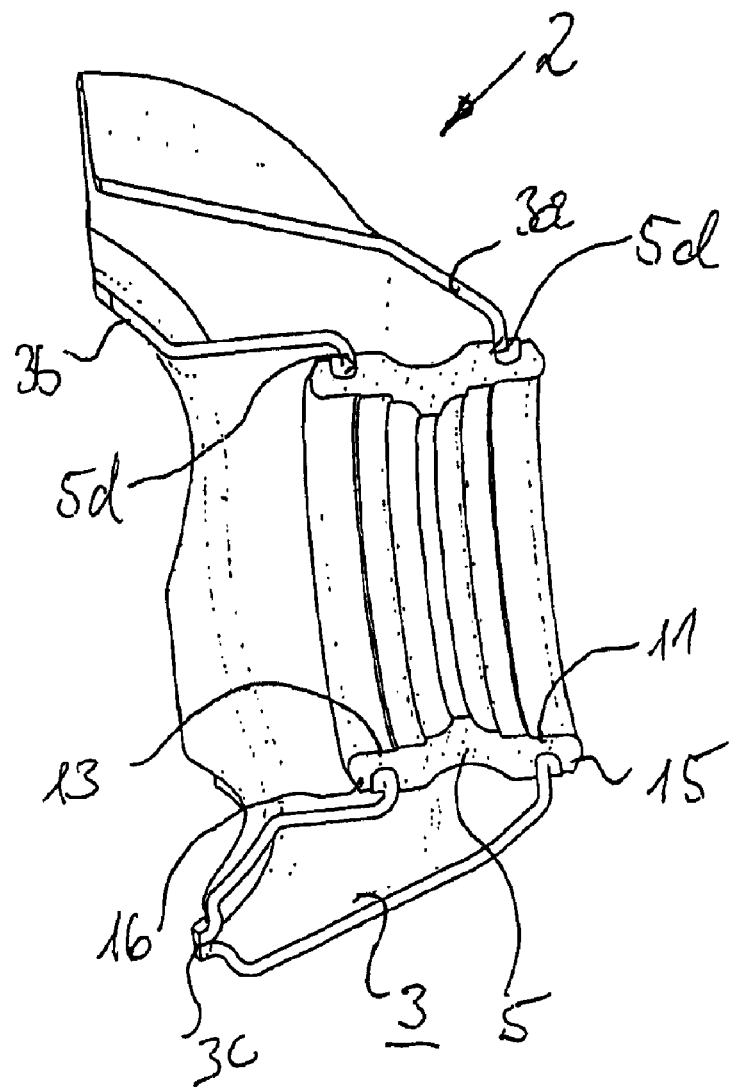
FIG. 1 illustrates a sectional view of an assembly of a unit of the present invention in a final assembled state.

The wheel bearing 4, in this case of the type of a two-row angular contact ball bearing, is formed by the outer ring 5, inner rings 6 on a hub 7 having a flange 8, and by two rows of rolling bodies 9 in cages 10. The invention is also valid for the use of units having roller bearings.

The wheel bearing 4 is held in a first bearing seat 12 by means of a first end section 11 and in a second bearing seat 14 by means of a second end section 13, in both axial directions of the wheel bearing 4 which are identically oriented to the bearing rotational axis 1a. To this end, each of the end sections 11 and 13 engages axially into in each case one of the bearing seats 12 and 14, respectively. The outer ring 5 is held on the support 3 by one end section 15 or 16 which is folded over radially on each of the end sections 11 or 13, respectively, immovably with respect to the support 3.

The outer ring 5 which is shown as an individual part in FIG. 3 has two raceways 5a for the rolling bodies 9. The raceways 5a are formed at least partially on a center rim 5b which protrudes radially in the direction of the bearing rotational axis 1a. The outer ring 5 is preferably a cold formed part and is configured integrally with the end sections 11 and 13. Each of the end sections 11 and 13 extends from a stop 5d of the outer ring 5 which is formed on the basic body 5c in one of the axial directions in a manner which is oriented identically to the rotational axis. The stops 5d are circularly annular faces which face in one of the axial directions.

At least before the ends 15 and 16 are folded over radially, the end sections 11 and 13 are configured to be rotationally symmetrical with respect to the rotational axis 1a of the wheel bearing 4 in such a way, that the external diameter of the outer contour of the end sections 11 and 13 becomes smaller as the spacing from the respective axial stop 5d increases. The radial wall thickness of the end sections 11 and 13 decreases as the axial spacing from the stops 5d increases. The outer contour line falls away in a curved manner toward the free axial end.

The described outer ring 5 is configured to be rotationally symmetrical and axially symmetrical. It is also conceivable that an outer ring of this type is not configured to be rotationally symmetrical and axially symmetrical. There is also provision for the radial and/or axial dimensions of the end sections on an outer ring to differ from one another. In a correspondingly adapted manner, the bearing seats of a support then also have different dimensions from one another.

The support 3 is shown in FIG. 2 and is formed from two support elements 3a and 3b. Each of the support elements 3a, 3b is a shell-shaped formed part made from sheet metal from cold forming processes in this application. The support elements 3a and 3b are fastened to one another by means of sheet metal connections 3c. It is also conceivable that the wheel bearing 4 is fastened to two supports 3a and 3b which are not directly connected to one another. One of the bearing seats 12 and 14 is formed in each of the support elements 3a and 3b. FIG. 2 shows the bearing seat 12 in the preform, in the form of the opening 19.

The bearing seats 12 and 14 are formed within a doubling 17 and 18, respectively, of the metal sheet. The doubling 17, 18 is formed by a portion 20a of the metal sheet 20 which is folded over radially outward away from the bearing's rotational axis 1a of the unit 1 by the respective bearing seat 12, 14 and adjoins the metal sheet 20 of the support element 3a, 3b axially. The contour of the bearing seats 12, 14 is of spherical configuration on the inside on both sides of the narrow point 22, see particularly FIG. 1a. The internal cross-section of the narrow point 22 is finished cylindrically over the axial width X. On both sides of the narrow point, the diameters $I_1$ to $I_x$ of the free internal cross-section of the passage 25 increase, at least in both axial directions, at an increasing axial spacing $A_x$ which is oriented identically with the bearing's rotational axis 1a of the wheel bearing 1, starting from the narrow point 22. In this example, the maximum axial spacing $A_x$ from the narrow point 22 is half the axial width B of the bearing seat 12, 14 in the passage 25. In the illustration according to FIG. 1b, the narrow point 22 is formed on a conical bearing seat 23 and, in this case, the maximum axial spacing $A_x$ from the narrow point 22 corresponds to the width B of the bearing seat 23.

The outer contour 24, which is surrounded by the bearing seat 12, 14, of an outer ring 5 which is seated in the bearing seat 12, 14 bears fixedly against the inner contour 21, in particular by way of the end sections 11, 13 which are modified by plastic deformation.

During the assembly of the outer ring 5 into the support 3, the outer ring 5 is first guided through an opening 19 of the support 3 (of the support element 3b) in the direction which is labeled by way of the arrow (FIG. 4) and is introduced into the second bearing seat 14 by way of the second end section 13. It is conceivable here that the end section 13 is pressed into the bearing seat 14 or else is introduced with a sliding snug fit. The opening 19 has an opening cross section which is described by the diameter dI. DI is greater than the maximum external diameter DA of the outer ring 5. The maximum external diameter DA also describes the external dimension of the circularly annular faces on the stops 5d.

Figure 1A:
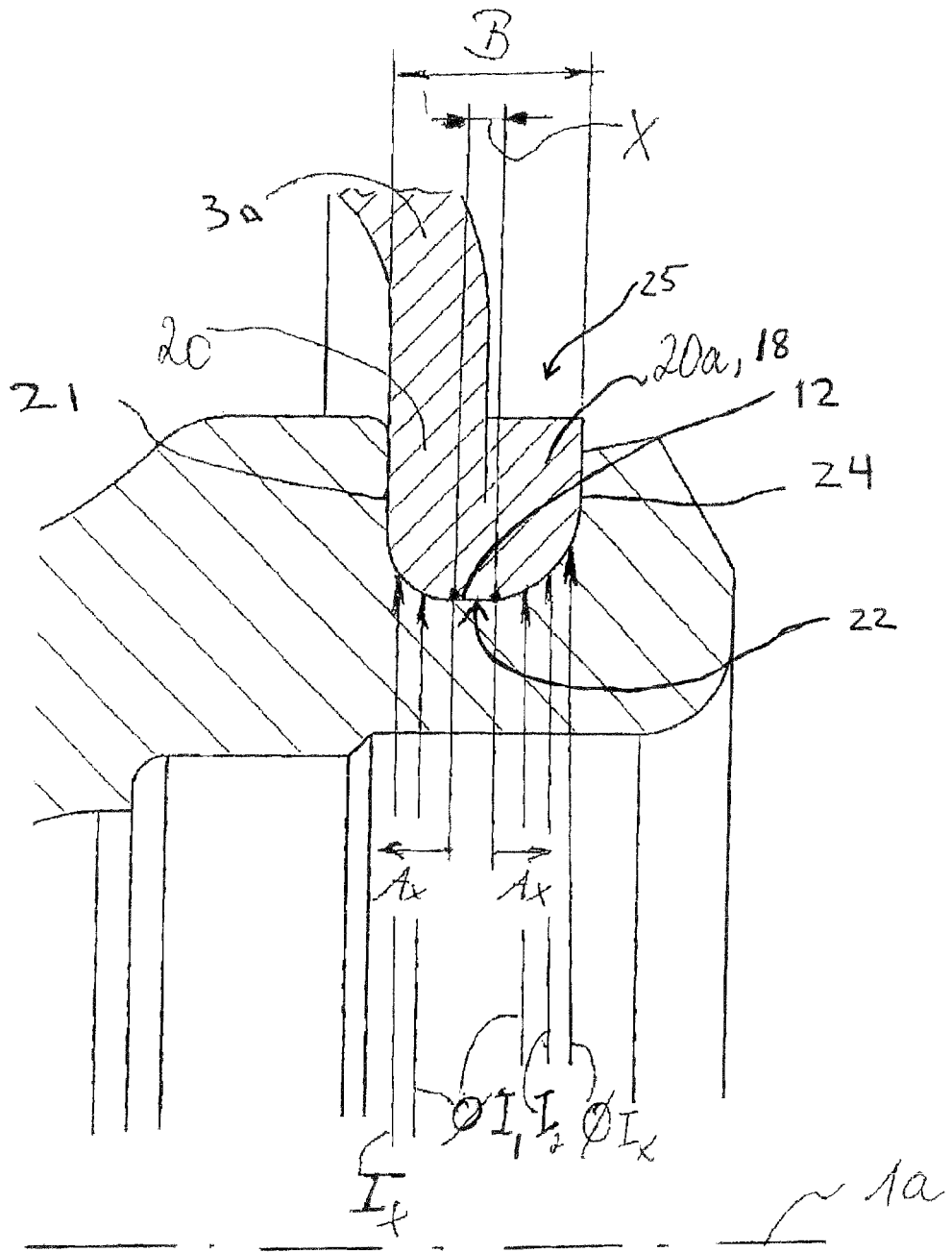
FIG. 1a illustrates a sectional view of a bearing seat in an outer ring of the present invention.
Figure 1B:
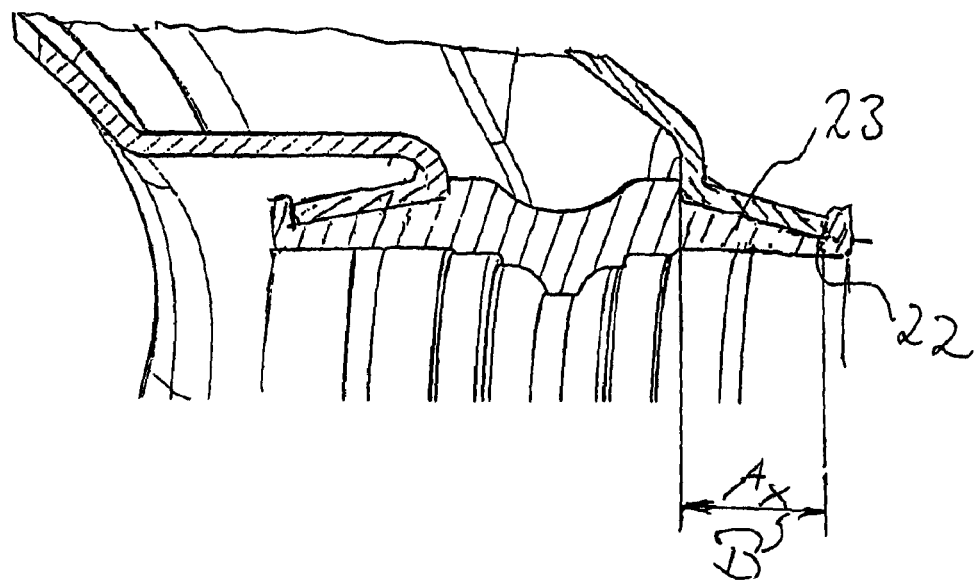
FIG. 1b illustrates a sectional view of an alternative refinement of the bearing seat of the present invention.
Figure 5C:
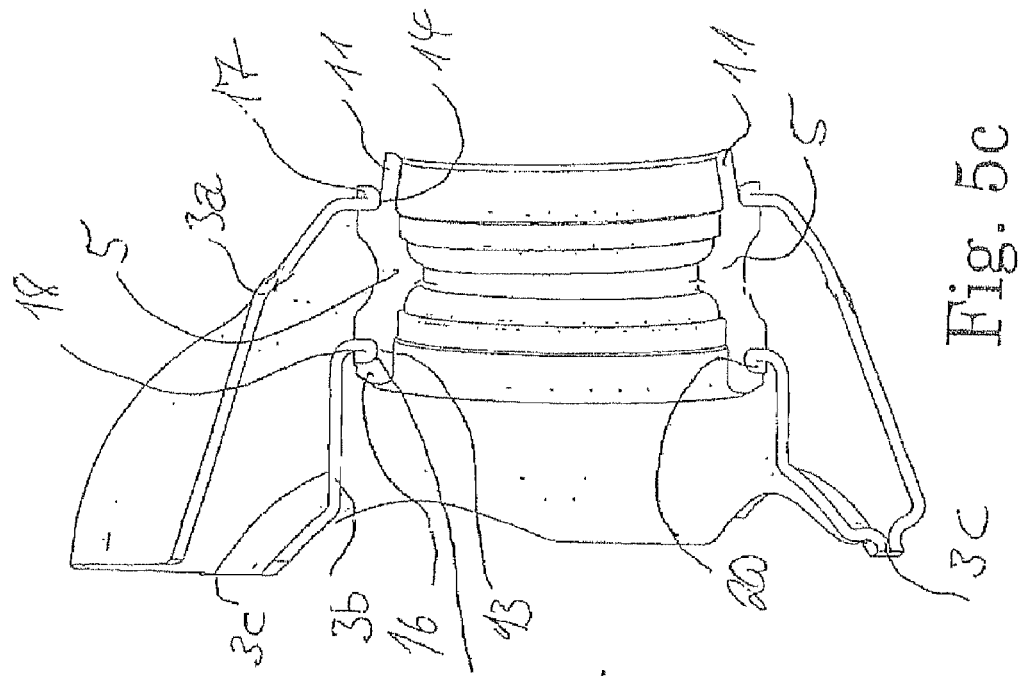
Figure 5B:
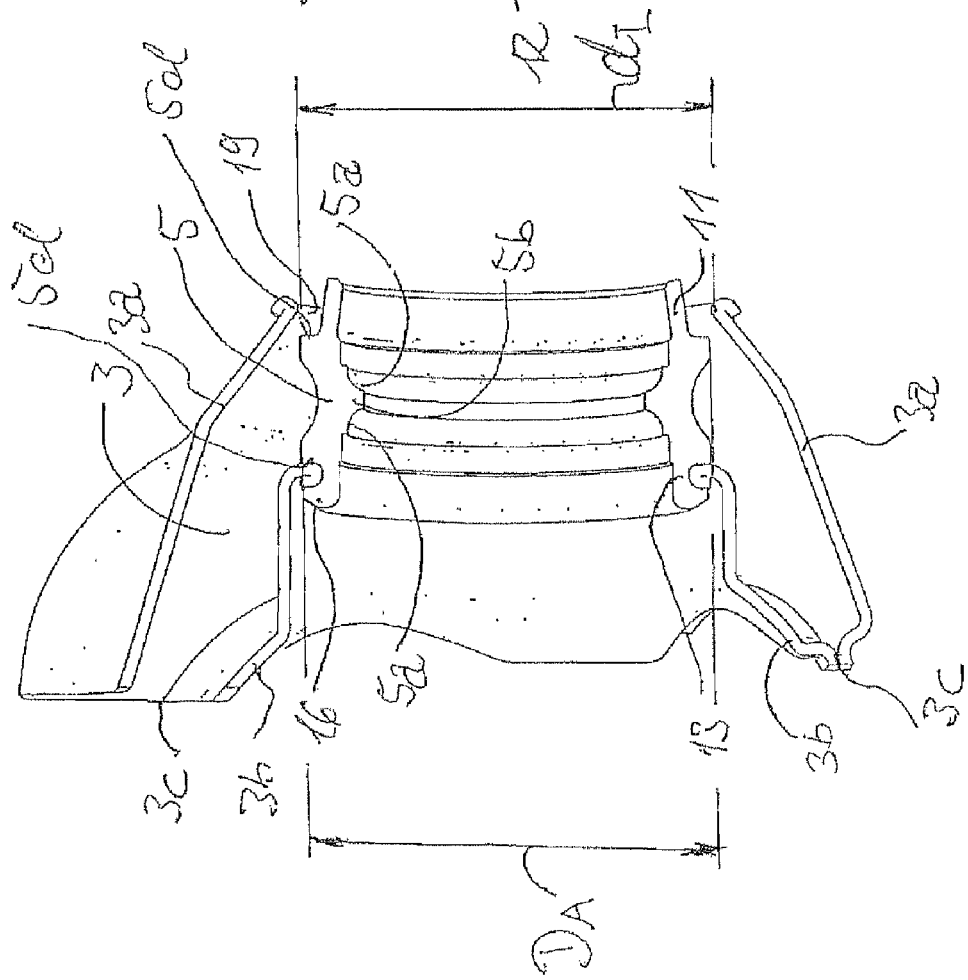
Figure 6:
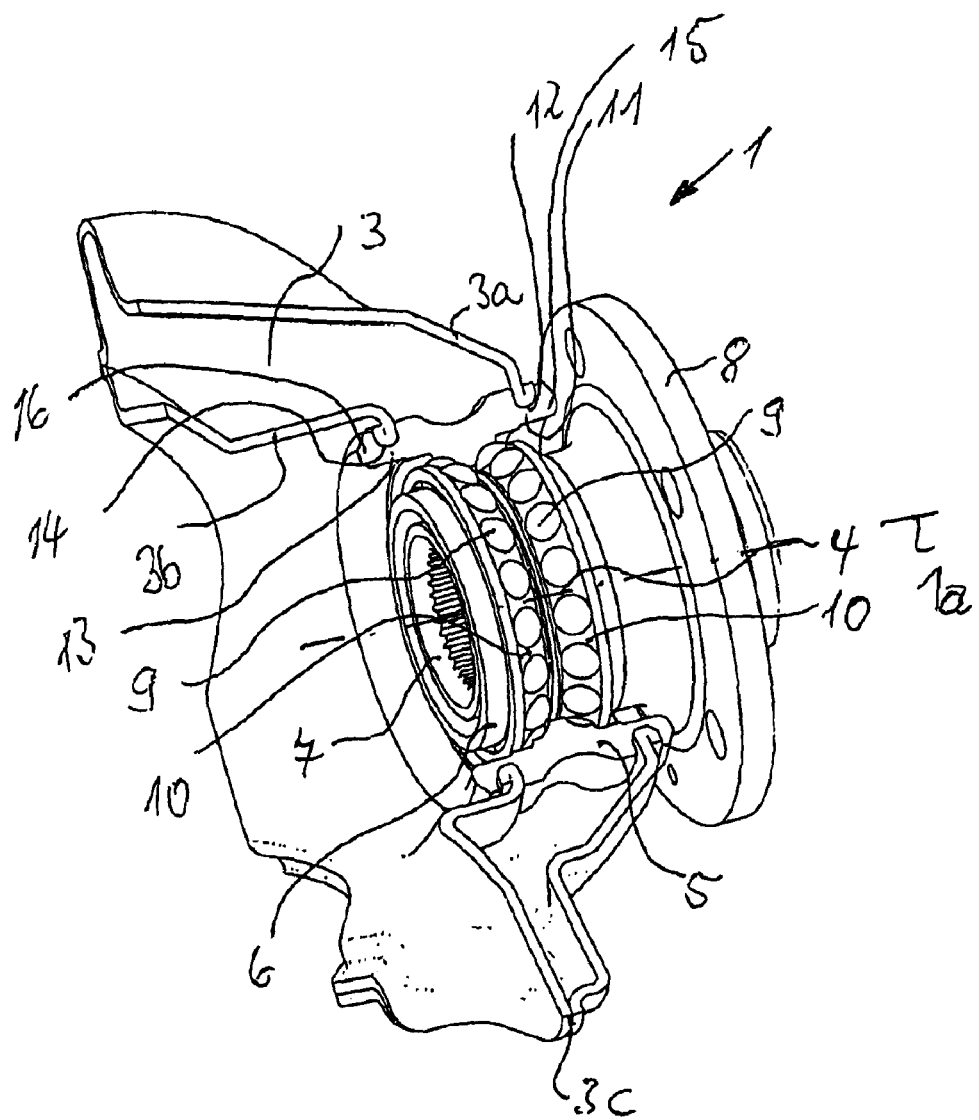
FIG. 6 illustrates a sectional view of the unit of the present invention.

After the introduction of the second end section 13 into the second bearing seat 14, the assembly of the structural unit can optionally be continued with the equivalent method steps which are described in the following:

According to one of the alternative method steps, the outer ring 5, as shown in FIG. 5b, is first fastened to the support 3 or the support element 3b, by radial folding over of the second end 16 of the material of the end section 13, in a manner which bears against one of the axial stops 5d. This step is then followed by a further step, in which the opening 19 is constricted by a plastic deformation with respect to the first bearing seat 12 in such a way that the first bearing seat 12 engages around the first end section 11. This state is shown in FIG. 5c. Finally, the outer ring 5 is fastened to the support 3 or the support element 3b by radial folding over of the first end 15 of the material of the end section 11, in a manner which bears against one of the axial stops 5d, which results in the structural unit 2 which is shown in FIG. 1.

According to the other of the alternative method steps, the outer ring 5, as shown in FIG. 5a, is first held axially between the support elements 3a and 3b. To this end, the opening 19 is constricted by plastic deformation with respect to the first bearing seat 12 in such a way that the first bearing seat 12 engages around the first end section 11. Finally, the outer ring 5 is fastened to the support 3 or the support element 3a or 3b by radial folding over of the first end 15 of the material of the end section 11 and by delayed or simultaneous radial folding over of the second end 16 of the material of the end section 13, in a manner which bears against one of the axial stops 5d, which results in the structural unit 2 which is shown in FIG. 1.

According to the other of the alternative method steps, the outer ring 5, as shown in FIG. 5a, is first held axially between the support elements 3a and 3b. To this end, the opening 19 is constricted by plastic deformation with respect to the first bearing seat 12 in such a way that the first bearing seat 12 engages around the first end section 11. Finally, the outer ring 5 is fastened to the support 3 or the support element 3a or 3b by radial folding over of the first end 15 of the material of the end section 11 and by delayed or simultaneous radial folding over of the second end 16 of the material of the end section 13, in a manner which bears against one of the axial stops 5d, which results in the structural unit 2 which is shown in FIG. 2.

As can be seen from the illustrations in FIGS. 5a and 5b, the end sections are longer (L) in the axial direction before fastening of the outer ring in the bearing seats than the respective bearing seats, which are assigned to one of the end sections and are formed in the shape of holes, are wide (B) in the axial direction (L>B). The axially protruding portion (annular sections 11a and 13a) has the portion of material which forms the radially folded over ends 15 and 16 after fastening of the outer ring 5 to the support 3. On the structural unlit which is in the finally assembled state, each of the end sections 11, 13 engages axially through one of the bearing seats 12, 14 in such a way that in each case one of the stops 5d and one of the ends 15 and 16 accommodate a part of the support axially between them.

LIST OF DESIGNATIONS

1 Unit
1a Bearing rotational axis
2 Assembly
3 Support
3a Support element
3b Support element
3c Sheet metal connection
4 Wheel bearing
5 Outer ring
5a Raceway
5b Center rim
5c Basic body
5d Stop
6 Inner ring
7 Hub
8 Flange
9 Rolling body
10 Cage
11 First end section
11a Annular section
12 First bearing seat
13 Second end section
13a Annular section
14 Second bearing seat
15 End
16 End
17 Doubling
18 Doubling
19 Opening
20 Metal sheet
20a Portion
21 Inner contour
22 Narrow point
23 Bearing seat
24 Outer contour
25 Passage

The invention claimed is:

1. A unit, comprising:
a wheel bearing; and
at least one vehicle-sided fixed support, the wheel bearing being seated fixedly by way of at least one outer part in at least one bearing seat which is formed as an axial passage of a sheet metal formed part of the support, and at least one end section of the outer part being folded over radially in a plastic manner at least near the passage, in such a way that the end section engages axially behind the support,
wherein the passage has a linear inner contour forming a first side wall, a linear outer contour forming a second side wall, a first concavely curved contour extending from the inner contour, a second concavely curved contour extending from the outer contour, and a linear base interposed between the first concavely curved contour and the second concavely curved contour, and
wherein centrally located at the base is a radial narrow point, and axially, from the radial narrow point toward the inner contour and the outer contour, a radial internal cross-section of the passage uniformly decreases at decreasing axial distance intervals from the narrow point toward the inner contour and the outer contour.

2. The unit as claimed in claim 1, wherein the axial spacing from the location, from which the internal cross-section begins to decrease in the direction of the narrow point, corresponds to at least half the maximum axial width of the passage which is oriented in the same direction as the bearing rotational axis.

3. The unit as claimed in claim 2, wherein the outer contour, which is surrounded by the bearing seat, of an outer part of the wheel bearing which is seated in the bearing seat bears toward the inner contour of the passage, at least starting from a location and at the narrow point.

4. The unit as claimed in claim 3, wherein the inner contour protrudes radially the furthest into the passage at least at the narrow point, in a circumferential manner about the bearing's rotational axis.

5. The unit as claimed in claim 3 wherein the outer contour which corresponds with the inner contour of the passage is deformed at least partially plastically toward the inner contour.

6. The unit as claimed in claim 1, wherein the outer part is an outer ring of the wheel hearing having at least one raceway for rolling bodies, and in that at least the end section is configured on the outside to be rotationally symmetrical about the bearing's rotational axis of the wheel bearing.

7. The unit as claimed in claim 1, wherein two of the passages are formed in the support.

8. The unit as claimed in claim 1, wherein the support has at least two of the sheet metal formed parts, each of the sheet metal formed parts having one of the bearing seats.

* * * * *